United States Patent [19]

Winsor

[11] Patent Number: 5,367,323
[45] Date of Patent: Nov. 22, 1994

[54] MIRROR MOUNT FOR USE IN EQUIPMENT FOR CONVERTING DIGITAL DATA INTO A LIGHT IMAGE

[75] Inventor: Malcolm Winsor, Mont Vernon, N.H.

[73] Assignee: Cirrus Technology Inc., Nashua, N.H.

[21] Appl. No.: 896,183

[22] Filed: Jun. 10, 1992

Related U.S. Application Data

[60] Continuation-in-part of Ser. No. 462,009, Jan. 8, 1990, abandoned, which is a division of Ser. No. 252,670, Oct. 3, 1988, Pat. No. 4,933,687.

[51] Int. Cl.$^5$ .............................................. B41J 2/435
[52] U.S. Cl. .................................. 346/139 R; 346/108
[58] Field of Search .................. 346/139 R, 1.1, 76 L, 346/108, 107 R, 160

[56] References Cited

U.S. PATENT DOCUMENTS

| | | | |
|---|---|---|---|
| 4,557,586 | 12/1985 | Hayashi et al. | 346/160 |
| 4,631,551 | 12/1986 | Vergona | 346/108 |
| 4,695,698 | 9/1987 | Mayor et al. | 346/76 L |
| 4,847,644 | 7/1989 | Oda et al. | 346/160 |
| 5,255,115 | 10/1993 | Kikuchi | 359/209 |

*Primary Examiner*—Mark J. Reinhart
*Attorney, Agent, or Firm*—E. T. Barrett

[57] ABSTRACT

In a digital imaging system in which a number of lasers provide different colored beams that are combined into a single collimated focused beam so that the film is exposed to all color components simultaneously, an improved mirror mount in which individual critical adjustments are made without affecting the setting of other adjustments. A mirror is mounted on a block that is in face-to-face relationship with a stand. A pivot ball is positioned in two recesses in the opposing faces to permit angular adjustment of the mounting block in a first plane relative to said stand, and a second adjustment permits movement of said block relative to said stand about the pivot ball in a plane perpendicular to said first plane. A third adjustment permits transverse movement of the mirror mount.

2 Claims, 5 Drawing Sheets

MIRROR MOUNT FOR USE IN EQUIPMENT FOR CONVERTING DIGITAL DATA INTO A LIGHT IMAGE

REFERENCE TO RELATED APPLICATIONS

This application is a continuation-in-part of U. S. co-pending application Ser. No. 07/462,009 filed Jan. 8, 1990, now abandoned, entitled SYSTEM FOR CONVERTING DIGITAL DATA INTO A LIGHT IMAGE which is division of U.S. application Ser. No. 07/252,670 filed Oct. 3, 1988, now U.S. Pat. No. 4,933,687, entitled LASER-ACTUATED DIGITAL IMAGING SYSTEM.

BACKGROUND OF THE INVENTION

1. Field of the Invention

This application relates to apparatus for forming photographic images from digital data and mare particular to a system for rapid and effective adjustment of the optical focusing and modulation components in such apparatus. Systems of this type are used, for example, to generate photographs from digital information collected by means of satellites, aircraft, or other sources. The digital information may be derived by scanning photographic prints or negatives. The digital information, after computer enhancement or other modification of the data, is reproduced in image form for use in such diverse applications as oil and mineral exploration, forestry and agricultural management surveillance, map making, and scientific study of the environment, printing, art, and medical diagnosis.

2. Description of Related Art

Digital imaging systems are in wide use for many applications. Both black and white and full color systems have been developed. In color systems, it is usual to either create a number of separate color beams or to separate an uncollimated white light source into color components by the use of filters. The separate beams are then intensity modulated in accordance with the digital information to be portrayed. A piece of photographic film is placed on a revolving drum where it is exposed to the modulated light beams. The photographic images are formed of small rectangular pixels that are individually exposed to the particular intensity and color called for by the digital data. In the typical color system, three separate beams of light are directed toward the film at different locations. The composite scanning exposure of the three beams produces the appropriate color and intensity at each pixel location. The quality of the prints made in this manner leaves something to be desired.

It is difficult to maintain the positioning of three separate beams with such precision that each pixel, which must be subjected to three successive exposures, is clearly defined and abuts the adjacent pixels without overlapping. In addition to the difficulties of separately controlling the three separate light beams, the rotation of the drum must be maintained with great precision at a constant speed to prevent the pixels from either being spaced apart or overlapping.

There are many advantages in combining the separate color beams into a single composite image which eliminates a number of sources of distortion. Whether the beams are combined or focused separably on the moving drum, the paths of the light beams between the source and the film surface must be controlled with high precision. Each component in the modulation and focusing sequence must be positioned with extreme accuracy. This is particularly difficult because of the interaction between various adjustments. Such adjustment must be stable and be capable of precision adjustment without interfering with the setting of other elements in the optical chain. None of the previously existing mounts for mirror are equivalent to the mount that forms the subject of this invention.

SUMMARY OF THE INVENTION

The present invention is described as embodied in a digital imaging system in which a number of lasers provide different colored beams that are combined into a single collimated focused beam so that the film is exposed to all color components simultaneously.

An improved alignment system is provided in which the different adjustments are entirely independent. The elevation of the final beam path is controlled by independently changing the angular path of each beam component before it is directed along the final beam path. The azimuth and elevation and the final lateral position of each beam component along the final beam path is independently adjusted by changing the azimuth and elevation angle of a mirror that deflects the corresponding beam component along the final beam path. In a preferred embodiment, a light beam is directed by a movable mirror to a modulator for varying the intensity of the beam in accordance with the digital data. The mirror and the modulation means are supported together in fixed relationship on a movable mount that is angularly adjustable independently from the optical source and from subsequent optical components. A dichroic mirror is supported in such manner that it can be easily replaced without marring the optical surface. The mirror is supported by a block and a stand in face-to-face relationship with a pivot ball positioned between the two parts. A first adjustment moves the mounting block angularly with respect to the stand, a second adjustment angularly adjusts the mounting block in a perpendicular plane, and a third adjustment permits lateral movement of the mirror mount.

DESCRIPTION OF THE PREFERRED EMBODIMENT

Figure 1:
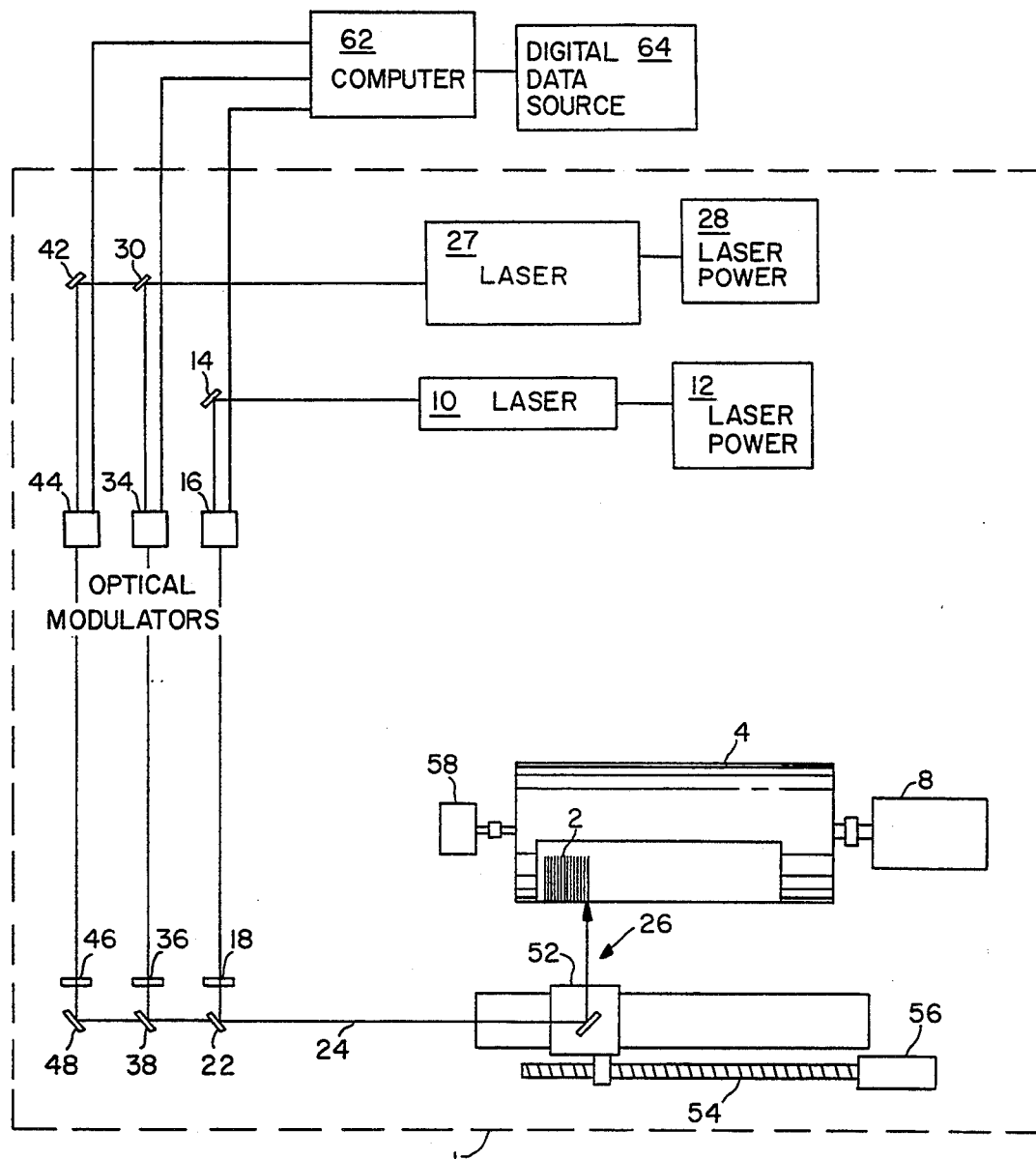
FIG. 1 is a diagrammatic over-all plan view of the imaging system.

As shown in FIG. 1, the entire imaging assembly is positioned on a base, diagrammatically illustrated at 1. A sheet of color negative film 2 is positioned on a drum 4 that is mounted, by any desirable means, for rotary motion. The drum 4 is driven at a substantially constant speed by a motor control circuit 6 and a dc motor 8. This drive system can be the same as those conventionally used for this purpose.

To provide the basic colors for the exposure, A first CW laser 10, operated from a power unit 12, is selected to emit light at the desired red wavelengths. This light is reflected by a mirror 14 into and through an optical modulator 16 and through a mask 18 onto a dichroic mirror 22. The dichroic mirror 22 is transparent to all wavelengths of the light except the red, which it reflects along a main beam path 24. The mask 18 is a conventional mask to eliminate unwanted side bands resulting from the diffraction effects of the optical modulator 16. In this case, the mask 18 is positioned to permit the first order side band to pass through it to the mirror 22. The main beam 24 is deflected by a mirror and aperture assembly, generally indicated at 26, onto the surface of the drum 4.

The other two color components, blue and green, are provided by a single CW laser 27, driven from a power unit 28. The emission from the laser 27 is separated into two separate bands by a dichroic mirror 30. The mirror 30 reflects the blue wavelengths into and through an optical modulator 34, through the opening in a mask 36, which passes the first order side band, onto as dichroic mirror 38. The mirror 38 reflects the blue light through the dichroic mirror 22, which reflects only the red light and is transparent to the blue and green wavelengths, into the coincident final beam path 24.

The green wavelengths, which pass through the dichroic mirror 30, are reflected by a mirror 42 through an optical modulator 44 and a mask 46 onto a mirror 48. From the mirror 48 the green wavelengths of light pass through the dichroic mirrors 38 and 22 into the final beam path 24. It is critical that the three light beams form a precise coincident beam that maintains its coincidence the full length of the path.

The mirror and aperture assembly 26 is mounted on an optical carriage, diagrammatically indicated at 52, which is driven horizontally parallel with the length of the drum 4 by a lead screw 54 and a stepping motor 56.

The operation of the optical modulators 16, 34, and 44 are controlled from a computer 62 that derives the digital data from a source 64. The computer control circuits, which may be provided by known kinds of modifications of existing circuits, are not described here. The optical modulators 16, 34 and 44 are of conventional design.

Figure 2:
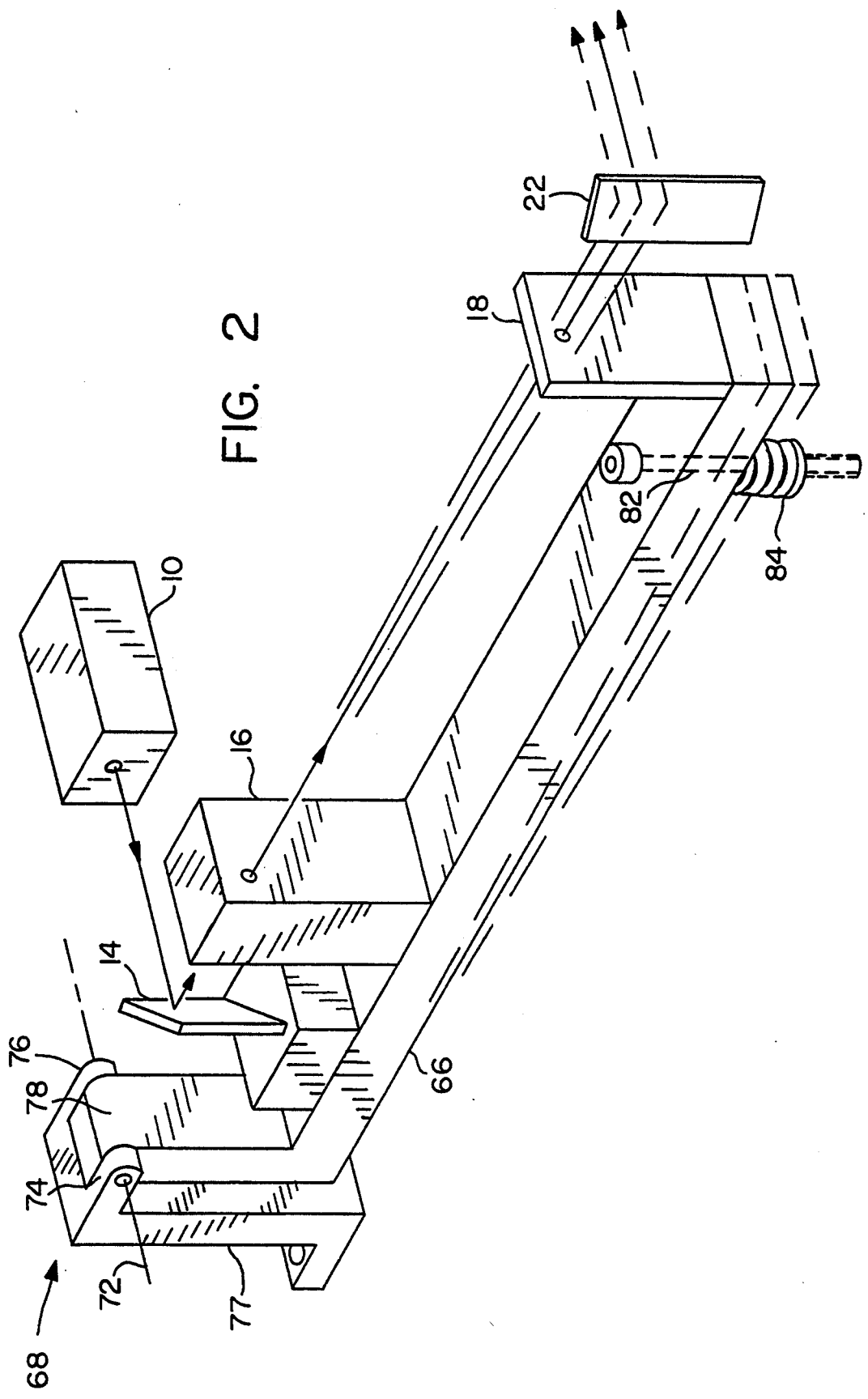
FIG. 2 is a perspective view of the mounting bar for adjusting the angle of a component light beam in order to control the elevation of the final beam.

One of the mechanisms for individually adjusting the altitude of the beams making up the final beam path is shown in FIG. 2. The beam from the laser 10 is reflected by the mirror 14 through the optical modulator 16 and the mask 18 to the dichroic mirror 22 as previously described. The mirror 14, the optical modulator 16 and the mask 18 are all mounted in fixed positions on a rigid mounting bar. The bar 66 is secured at one end to a pivotal mounting, generally indicated at 68. A pivot pin 72 extends between a pair of spaced ears 74 and 76 of a support member 77 that is suitably secured to the base 1. The pin 72 passes through an opening in an upright member 78 secured to one end of the mounting bar 66. The mounting bar is thus permitted to move in a vertical direction angularly around the pin 72. An adjusting screw 82 extends through a clearance opening in the bar 66 and is in threaded engagement with the base 1. The bar 66 is biased in an upward direction by a spring 84 around the screw 82. Adjustment of the screw 82 tilts the mirror 14, along with the modulator 16 and a mask 18, and changes the vertical angle of the beam along the bar 66 and thus the height at which the beam strikes the dichroic mirror 22. By this means the vertical height of the beam along the line of the final beam path 24 can be adjusted.

A similar adjustment bar is provided for each of the other two beams. One of these bars (not shown) supports the dichroic mirror 30, the optical modulator 34, and the mask 36. The remaining bar (not shown) supports the mirror 42, the optical modulator 44 and the mask 46. By adjustment of the three mounting bars, the beams can all be adjusted for the correct height along the final beam path 24.

Three mirror mounts (FIG. 3), generally indicated at 86, 86A and 86B, provide means for independent adjustment of the angles of azimuth and elevation and the horizontal position of each respective beam reflected by the three mirrors 22, 38 and 48. The mirror mounts are identical except for the color characteristics of the dichroic mirrors. As illustrated, the mirror mount 86 is supported by a base member 88 secured to the base 1 (FIG. 1). A mirror stand 92 is mounted for horizontal adjustment on the base member 88. A groove 90 having inwardly sloping side surfaces is formed in the base member 88 and receives an extension bar 94 that fits within the groove. To provide horizontal adjustment of the mirror stand 92 within the groove 90, an adjustment screw 96 extends through an opening 98 in the mirror stand and is in threaded engagement with the base member 88.

A mirror block 102 (see also FIG. 4) is supported by the mirror stand 92. This mirror block is positioned in face-to-face relationship with an L-shaped cut-out portion of the mirror stand 92. The mirror block 102 is separated from the surface of the mirror stand 92 by a steel ball 104 that is positioned in a pivot socket 106 in the mirror stand 92 and in a similar pivot socket 108 in the mirror block 102. By this means limited pivotal movement of the block 102 about the ball 104 is possible. The mirror block is held against the face of the mirror stand 92 by a spring 109 (FIG. 5) that is around a screw 110 between the head of the screw and a shoulder 111 in the mirror stand 92. The screw 110 is in threaded engagement with the mirror block 102. The angle and direction of the tilt of the mirror block 102 is controlled by two pins 112 and 112a that form part of the mirror block 102 and extend respectively into openings 118 and 116 in the face of the mirror stand 92.

A first threaded opening 122 extends vertically from the top of the stand 92. A control member 124, which has two spaced threaded sections that engage a threaded opening 122, may be moved vertically by a screwdriver adjustment. A conical surface 126 on the control member 124, between the two threaded portions, is engaged by the end of the pin 112. As the control member 124 is turned in the threads of the hole 122, the conical surface 126 moves vertically and changes the horizontal position of the pin 112. This adjustment changes the angular position of the block 102 in a horizontal plane.

An identical arrangement is provided in connection with a second threaded opening 122a by which the position of the pin 112a is adjusted the pins 112 and 112a lie on perpendicular lines that intersect at the center of the ball 104. The mirror block 102 is this adjustable independently for movement in either the horizontal or vertical plane. The pins 112 and 112a should fit loosely within the corresponding openings 118 and 116, and it is important to provide means to prevent angular twisting of the block 102 to maintain the independence of the azimuth and elevational adjustments. This is accomplished by a bar 119 that extends horizontally between the bottom portion of the block 102 and the mirror stand 92 and is secured at one end by a screw 120 to the block 102 and at the other end by a second screw 121 to the mirror stand 92.

Figure 6:
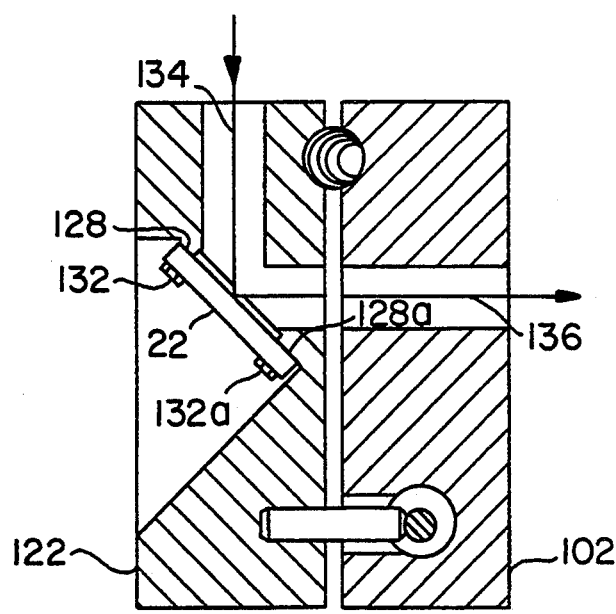
FIG. 6 is a horizontal sectional view of one of the mirror mounts of FIG. 3.

The dichroic mirror 22 is positioned at a 45 degree angle in the mirror block 102. As shown in FIG. 6, the mirror 22 is positioned adjacent one wall of an angular recess in the block 102. The edges of the mirror are retained against a pair of shoulders 128 and 128a by a pair of leaf springs, indicated diagrammatically at 132 and 132a. With this arrangement, the mirror 22 can be removed for cleaning and replacing without scratching because no metal is in contact with the active portion of the mirror surface.

The light from the optical modulator 16 (FIG. 1) passes through the mask 18 and through an opening 134 (FIGS. 4 and 6) in the block 102 to the mirror 22. This light is reflected by the mirror 22 through an opening 136 in the block 102 and opening 136a in the mounting 92 (FIG. 4) to become part of the final beam. The green light that is reflected from the mirror 48 and the blue light that is reflected from the dichroic mirror 38 pass through the dichroic mirror 22, which reflects only the red wavelengths to form the final coincident beam.

Figure 3:
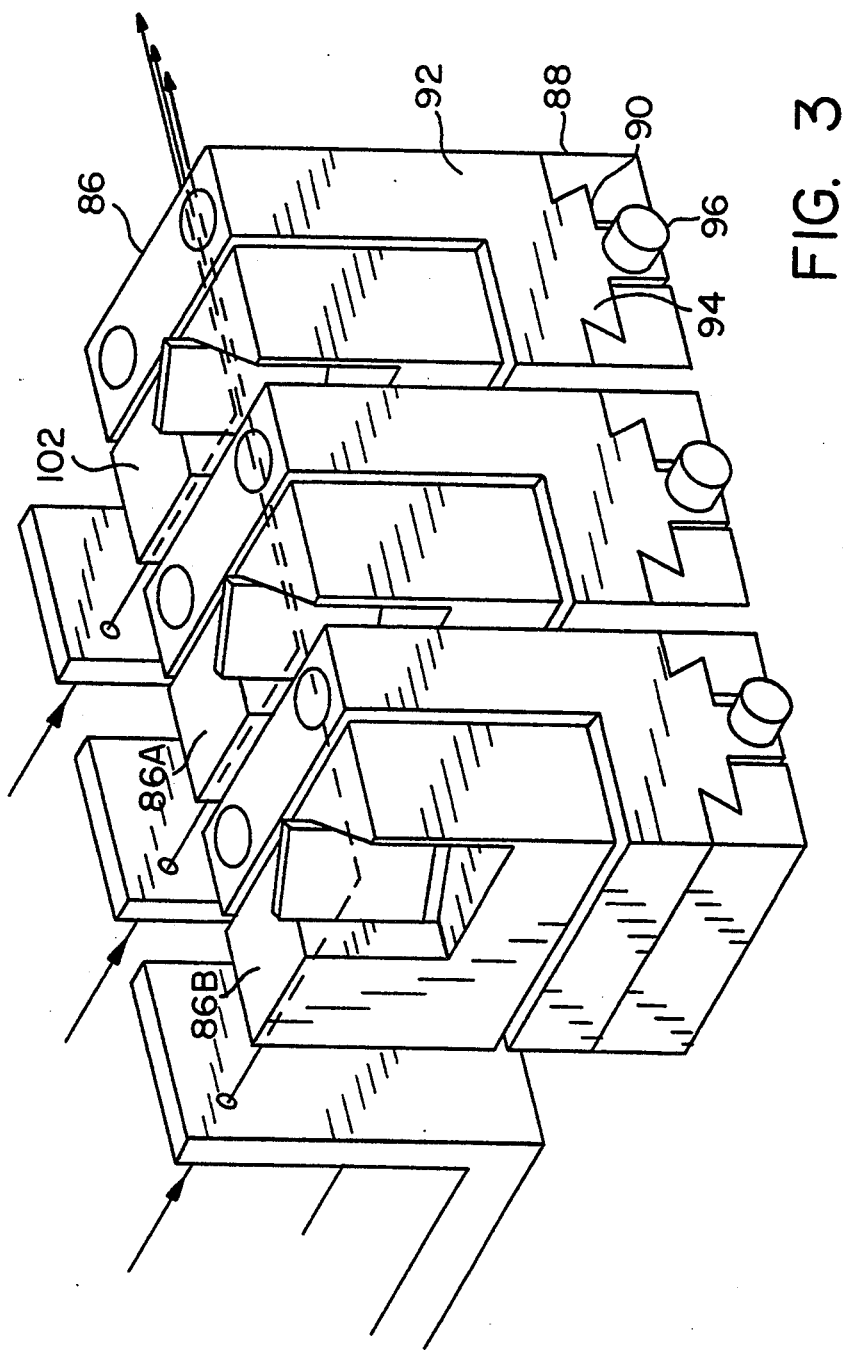
FIG. 3 is a perspective view of three mirror mounts for adjusting the azimuth and elevation angles of the beam components.

The three mirror mounts 86, 86A and 86B are positioned adjacent each other in alignment as shown in FIG. 3. The adjustment of the final beam requires that the three light beams be coincident and (a) at the same elevation; (b) have the same angles of elevation and azimuth; and (c) be horizontally positioned along the same line.

Figure 4:
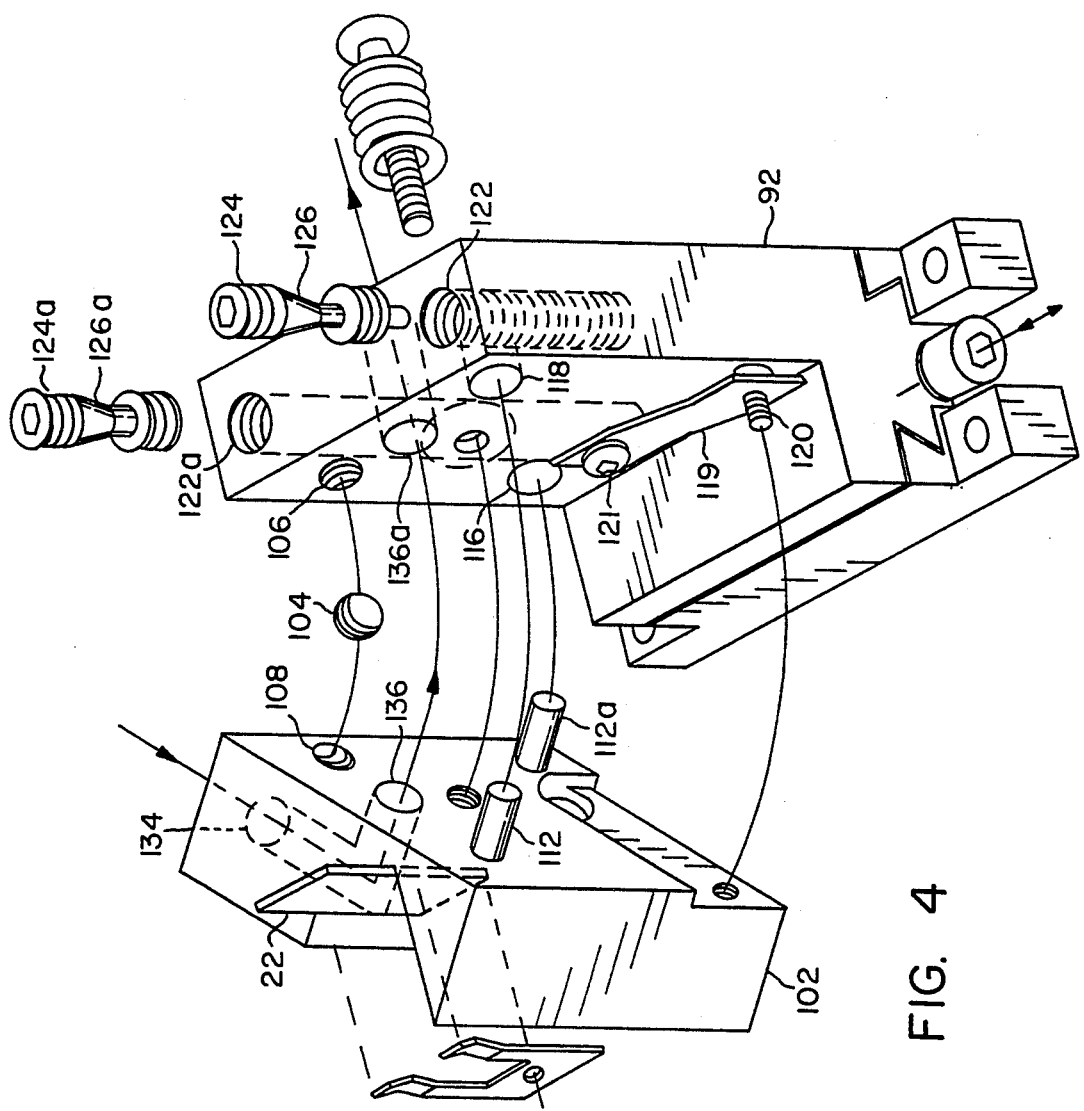
FIG. 4 is an exploded perspective view of one mirror mount.
Figure 5:
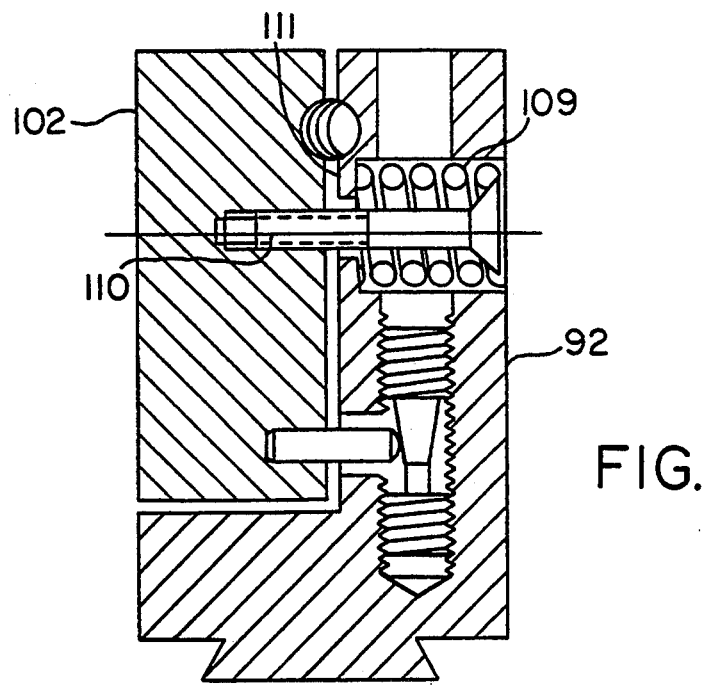
FIG. 5 is a partial vertical sectional view of the mirror mount.

The elevation of the red portion of the beam along the final path is controlled by the adjustment screw 82 (FIG. 2) which changes the angle of the mounting bar 66 and thus the point at which the red beam strikes the dichroic mirror 22. Adjustment of the elevation of the final beam path in this manner will, to a slight extent change the angle of the beam along the final path. This is compensated by subsequent adjustment of the angle of the dichroic-mirror 22 relative to the vertical plane. The azimuth of the final beam is adjusted by the adjustment screw 124 (FIG. 4). The elevational angle of the final beam path is adjusted by a screw (not shown) similar to the screw 124 that is in threaded engagement with the opening 122a and adjusts the horizontal position of the pin 112a. The horizontal position of the beam is adjusted by the screw 96 (FIG. 3) that moves the mirror stand transversely on the base 1. Identical adjustments are provided for each of the three beams.

To adjust the three beams to a single coincident beam along the final path, the carriage 52 is moved as near as possible to the mirror 22. The optical modulator 16 is then adjusted to permit maximum passage of the red beam, while the other modulators 24 and 44 are adjusted to block the passage of light. The height of the beam is then adjusted by means of the screw on the mounting bar 66 (FIG. 2). The beam is then adjusted for lateral position by the screw 96 on the mirror stand 92, and for azimuth and elevation angles by the screw 124 and its companion (not shown). When the light beam appears in a detectable position, the carriage 52 is moved away from the mirror 22 until the beam fades, but is not extinguished. The mirror 22 is the adjusted again in elevation and azimuth until the beam reaches maximum intensity at the carriage. The carriage is then again moved back to its original position and again adjusted for maximum intensity. The carriage is then moved again away from the mirror 22 until the beam begins to fade, but is not extinguished. With each repetition of this adjustment cycle, the distance between the mirror 22 and the carriage 52 before the beam fades will be greater. When optimum adjustment of the red beam has been achieved, that beam is extinguished and the other two beams are individually adjusted in the same manner. Final adjustment is made with all three beams turned on. This will be primarily the adjustments of the horizontal and vertical positions of the beam components.

I claim:

1. In a system for converting digital information into a light image, a mirror mount for independent adjustment of angles of azimuth and elevation including
   a mirror,
   a mounting block supporting said mirror and having a surface with a first spherical recess,
   an adjustable stand in face-to-face relationship with said mounting block and having a second spherical recess,
   a ball occupying said recesses,
   a first adjustment means for moving said mounting block with respect to said stand angularly about said ball in a first plane, and
   a second adjustment means for moving said mounting block with respect to said stand angularly about said ball in a second plane perpendicular to said first plane.

2. The combination as claimed in claim 1 including a third adjustment means for moving said mirror mount transversely.

* * * * *